US009495275B2

(12) United States Patent
Deshpande et al.

(10) Patent No.: US 9,495,275 B2
(45) Date of Patent: **\*Nov. 15, 2016**

(54) SYSTEM AND COMPUTER PROGRAM PRODUCT FOR DERIVING INTELLIGENCE FROM ACTIVITY LOGS

(75) Inventors: Prasad M. Deshpande, Mumbai (IN); Raghuram Krishnapuram, Bangalore (IN); Debapriyo Majumdar, Bangalore (IN); Deepak S. Padmanabhan, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 2123 days.

This patent is subject to a terminal disclaimer.

(21) Appl. No.: 12/111,356

(22) Filed: Apr. 29, 2008

(65) Prior Publication Data

US 2009/0271800 A1    Oct. 29, 2009

(51) Int. Cl.
*G06F 11/34*    (2006.01)

(52) U.S. Cl.
CPC ................. *G06F 11/3476* (2013.01)

(58) Field of Classification Search
CPC ............ G06F 3/0481; G06F 17/3053; G06F 17/30554; G06F 11/30
USPC .................. 715/789, 788, 781, 764
See application file for complete search history.

(56) References Cited

U.S. PATENT DOCUMENTS

| 6,778,971 | B1 | 8/2004 | Altschuler et al. |
| 6,957,390 | B2 | 10/2005 | Tamir et al. |
| 7,739,724 | B2 * | 6/2010 | Durham et al. ............ 726/3 |
| 7,853,684 | B2 * | 12/2010 | Koch et al. ............ 709/224 |
| 2006/0085788 | A1 | 4/2006 | Amir et al. |

OTHER PUBLICATIONS

He, Goker, Harper, "Combining Evidence for Automatic Web Session Identification", Information Processing and Management, An International Journa, 2002.
Spiliopoulou et al., "A Framework for the Evaluation of Session Reconstruction Heuristics in Web Usage Analysis", Informs Journal on Computing, 2003.
Facca, Lanzi, "Mining Interesting Knowledge from Weblogs: A Survey", Data and Knowledge Engineering, 2003.
Eirinaki, Vazirgiannis, "Web Mining for Web Personalization", TOIT, 2003.
Queries and Judgments (source: http://www10.org/cdrom/papers/317/node5.html).

* cited by examiner

*Primary Examiner* — Jeffrey A Gaffin
*Assistant Examiner* — Sabrina Greene
(74) *Attorney, Agent, or Firm* — Ryan, Mason & Lewis, LLP

(57) ABSTRACT

Techniques for segregating one or more logs of at least one multitasking user to derive at least one behavioral pattern of the at least one multitasking user are provided. The techniques include obtaining at least one of at least one action log, configuration information, domain knowledge, at least one task history and open task repository information, correlating the at least one of at least one action log, configuration information, domain knowledge, at least one task history and open task repository information to determine a task associated with each of one or more actions and segregate the one or more logs based on the one or more actions, and using the one or more logs that have been segregated to derive at least one behavioral pattern of the at least one multitasking user. Techniques are also provided for deriving intelligence from at least one activity log of at least one multitasking user to provide information to the at least one user.

16 Claims, 7 Drawing Sheets

SYSTEM AND COMPUTER PROGRAM PRODUCT FOR DERIVING INTELLIGENCE FROM ACTIVITY LOGS

CROSS-REFERENCE TO RELATED APPLICATION(S)

The present application is related to a commonly assigned U.S. application entitled "Method for Deriving Intelligence from Activity Logs," identified by Ser. No. 12/111,325, and filed on even date herewith, the disclosure of which is incorporated by reference herein in its entirety.

FIELD OF THE INVENTION

The present invention generally relates to information technology, and, more particularly, to activity logs.

BACKGROUND OF THE INVENTION

A system can be used for multiple tasks. An example may be that of looking up a technical reference manual which has a web interface to solve multiple problems at hand. The user, in such a case and many other cases, does not specify the specific task at hand for which he or she is using the system. An example can include the scenario of a reference portal for server system administration, wherein the system administrators have multiple problems to be solved at any given point of time. They perform various actions on the portal to solve these problems, and switch between problems very often.

To assess the effectiveness of using the system, one can advantageously do analytics on the usage logs to understand what features in the system were used more and what sequences of steps were done to effectively solve a problem. To do any meaningful analysis, one would process the logs to arrive at task-specific logs. However, the existing approaches do not overcome these issues.

Challenges of log segregation include, for example, that the logs are intertwined. Different people can work at the same time, and/or each person can work on multiple tasks at the same time. Also, no user gives explicit indication of the task associated with each of his or her actions. Additionally, in many instances, including service delivery, there is an "open tasks repository" where one can get the list of open tasks against a person at any given point of time. And as stated above, task specific logs are required to do meaningful analyses. Existing approaches, however, do not include task specific log analysis or segregating intertwined logs.

Further, existing approaches do not include deriving information about the user activity from logs even if there is no explicit indication of the task associated with each action so as to improve user experience by automatically changing the user interface, and/or provide suggestions to the user based on the current task being performed.

SUMMARY OF THE INVENTION

Principles of the present invention provide techniques for deriving intelligence from activity logs.

An exemplary method (which may be computer-implemented) for segregating one or more logs of at least one multitasking user to derive at least one behavioral pattern of the at least one multitasking user, according to one aspect of the invention, can include steps of obtaining at least one of at least one action log, configuration information, domain knowledge, at least one task history and open task repository information, correlating the at least one of at least one action log, configuration information, domain knowledge, at least one task history and open task repository information to determine a task associated with each of one or more actions and segregate the one or more logs based on the one or more actions, and using the one or more logs that have been segregated to derive at least one behavioral pattern of the at least one multitasking user.

In an embodiment of the invention, an exemplary method for deriving intelligence from at least one activity log of at least one multitasking user to provide information to the at least one user includes the following steps. Information about at least one of at least one past action, configuration information, domain knowledge and at least one task history is obtained. The information about at least one of at least one past action, configuration information, domain knowledge and at least one task history are correlated to determine a task associated with each action and segment the at least one activity log based on one or more actions. Each segmented activity log, current configuration of an application, domain knowledge, configuration information and one or more action histories is used to provide information to the at least one user.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
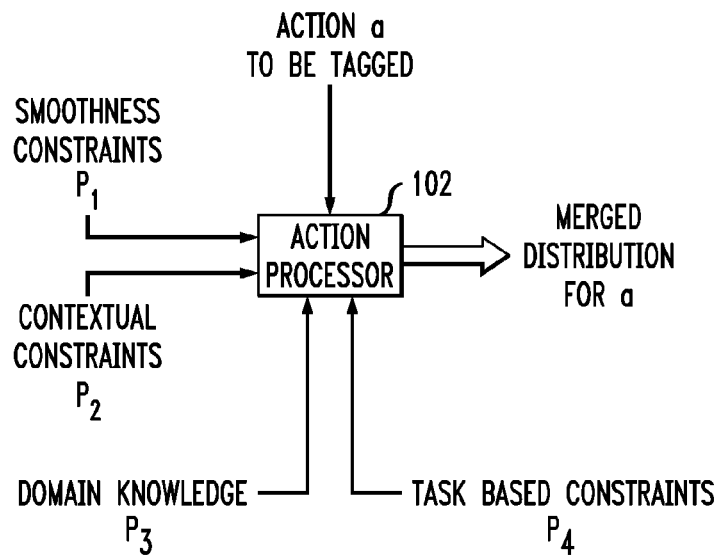
FIG. 1 is a diagram illustrating a log segregation approach, according to an embodiment of the present invention.

Principles of the present invention include deriving intelligence from the activity logs of multitasking users. Also, principles of the invention include segregating activity logs by tasks to derive behavioral patterns of multitasking users.

Consider a system (computer system or an application) which may be used by Is multiple users at any given time. Actions performed by different users can be usually distinguished by the system. An objective may include, for example, using the logs to learn about user behavior and improve user experience by auto suggestions and optimizing the user interface (UI), and/or get the logs from the system and segregate them to per task logs.

However, a problem may exist in that each user may have multiple tasks for which he or she may be using the system. For example, one can be searching the web for resources to do multiple assignments, and/or using a knowledge portal to work on multiple problem tickets. Also, the set of tasks that a user is working on currently can be available to the system in a service delivery scenario (where tasks correspond to tickets), and the user may not explicitly mention the task associated with his or her present action. Additionally, the logs can be intertwined, wherein different people work at the same time, and each person works on multiple tasks at the same time. Further, in many cases (including, for example, service delivery), there can be an open tasks repository where one can get the list of open tasks against a person at any given point of time.

One or more embodiments of the present invention include automatically segregating the logs on a per-task basis. Implementation of the techniques described herein can include, for example, coding up an action processor, which aggregates the constraints and arrives at selection of a task (fuzzy or otherwise) for each action on the portal. Also, one or more embodiments of the invention provide relevant information and/or suggestions to the user based on the current task being performed, arrive at UI reconfiguration suggestions using such separated logs, and monitoring user activity to, for example, ensure compliance to guidelines, detect suspicious deviations from regular behavior and track the usage of use cases.

The techniques described herein separate the action logs of multi-tasking users where there is no explicit indication of the task associated with each action performed (using, for example, action logs (that is, past actions), configuration information, domain knowledge and/or task histories) to task-specific logs. As noted above, such separated logs can be used to, for example, for providing relevant information and/or suggestions to the user based on the current task being performed, as well as arriving at UI reconfiguration suggestions using such separated logs.

As described herein, one or more embodiments of the invention include log segmentation by tasks. A typical usage log can include information such as, for example, user name, session, time, action performed (portlet, action, type), parameters to the action, everything that is passed to the action (for example, edit box values entered), duration of the action, and preceding linked action, if any.

From these items, one can segment logs by user, session and time (usually can be done easily because of explicit indications), identify tasks the user might be working on at that time, and associate each action with most likely task(s). As such, one or more embodiments of the present invention can include, for example, the usage of the information gathered in the second noted step to accomplish associating each action with most likely task(s).

Assume, for example, that a user does not switch tasks very frequently. Because changing tasks requires a context switch by the user, the user will prefer to finish a task before shifting to the next one. Also) any task switch may be associated with some action that may or may not be captured in the log. When a new task is opened, the probability of the user working on that task for the next few actions is very high. Further, when a task is closed, the last few actions before the task closure are likely to be related to the task that got closed.

There can be certain constraints based on the UI and domain knowledge. For example, only a subset of actions can be performed on any given UI configuration. Also, for instance, certain actions may be chained to the same tasks. As an example, if a user submits a search query and clicks on one of the results, it is highly likely that the search action and the result click action are associated with the same task.

FIG. 1 is a diagram illustrating a log segregation approach, according to an embodiment of the present invention. By way of illustration, FIG. 1 depicts an action processor 102, as well as the elements described below. As illustrated in FIG. 1, for an incoming action "a," a specific task is associated with this action. This tagging automatically leads to log segregation, as the task-specific logs can be obtained as the concatenation of all actions that are tagged with the same task, actions ordered in time. One can use a set of constraints to accomplish this segregation, as is described below.

One or more embodiments of the present invention include smoothness constraints. Users may not switch between tasks very often. As such, smoothness constraints can be based on the assumption that users stay with the same task more frequently than switching. Thus, P1 (the component parameterized by the smoothness constraints in FIG. 1) would reflect the probability distribution of the preceding action(s) so that this would bias the action processor to assign the continuing task more than a new task.

Also, one or more embodiments of the invention include contextual constraints. Users tend to work more on recently opened tasks. As such, the probability of working on a task is high immediately after it is opened and immediately before it is closed. This is based on the assumption that external events may influence the assignment of an action to a task. For example, an external event signaling the arrival of a new task in the queue could pump up the probability that the next action would be associated with the new arrived task. If a new ticket has been opened, the probability of the user working on that ticket is high. $P_2$ would reflect the combination of the recency of the tickets and how soon the ticket was closed after this action.

Further, the techniques described herein may include domain knowledge. Domain knowledge can influence the assignment of actions to tasks. An example would be to use lexical similarity of the action (search query entered, etc.) with the task detail to influence the probability of the action to be assigned with that specific task. In this case, P3 would reflect the similarity of the action parameters to the task description. Additionally, one or more embodiments of the invention can include task based constraints. Certain actions are logically a follow-up of another action earlier in the history as, for example, usage patterns suggest that some action in history logically entails the next action, and/or the output of an earlier action is the input to the present action. Examples of task based constraints can include the following. If A is most usually succeeded by B according to the logs, P4 for B would closely approximate the merged distribution for A. Also, if the output of A feeds to B (such as A being a search query, and B being the click on a result), P4 for B would closely approximate the merged distribution for A.

Figure 2:
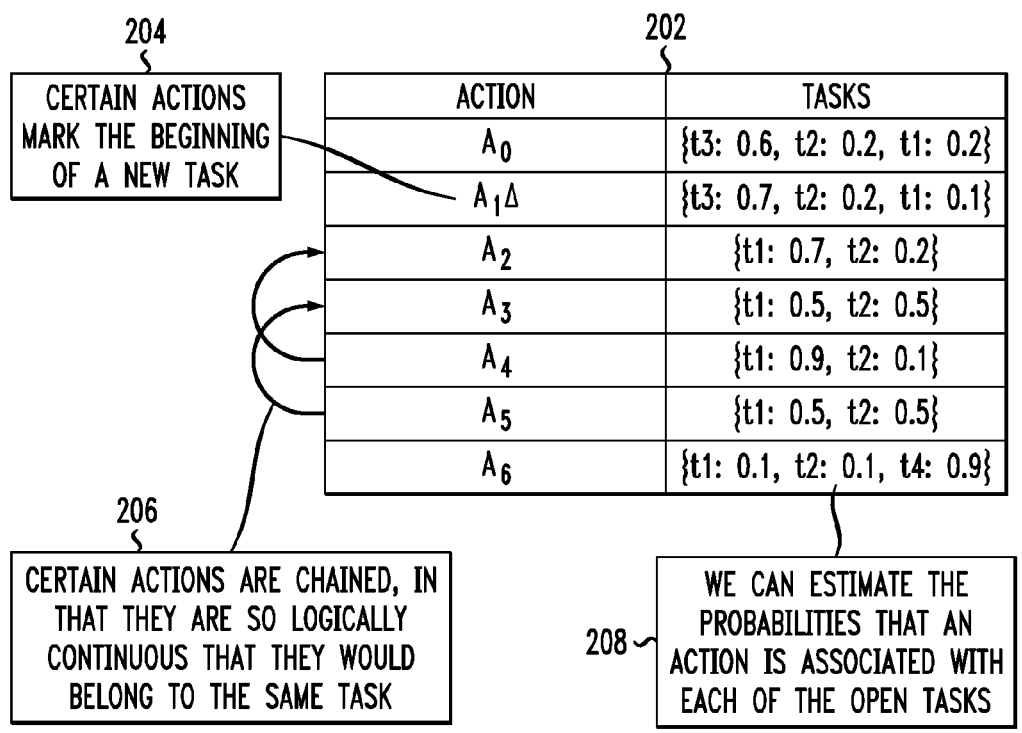
FIG. 2 is a diagram illustrating a usage log with fuzzy segregation, according to an embodiment of the present invention.

FIG. 2 is a diagram illustrating a usage log 202 with fuzzy segregation, according to an embodiment of the present invention. By way of illustration, FIG. 2 depicts element 204, which indicates that certain actions mark the beginning of a new task. FIG. 2 also depicts element 206, which indicates that certain actions are chained, in that they are so logically continuous that they would belong to the same task. Also, FIG. 2 depicts element 208, which indicates that one can estimate the probabilities that an action is associated with each of the open tasks.

The fuzzy segregation may be made crisp by selecting the task which has the maximal probability. The action processor, to accomplish its task of log segregation, can use data sources (in addition to the constraints) including, for example, historical annotated logs, the repository of open tasks at that given point of time, and domain knowledge.

Figure 3:
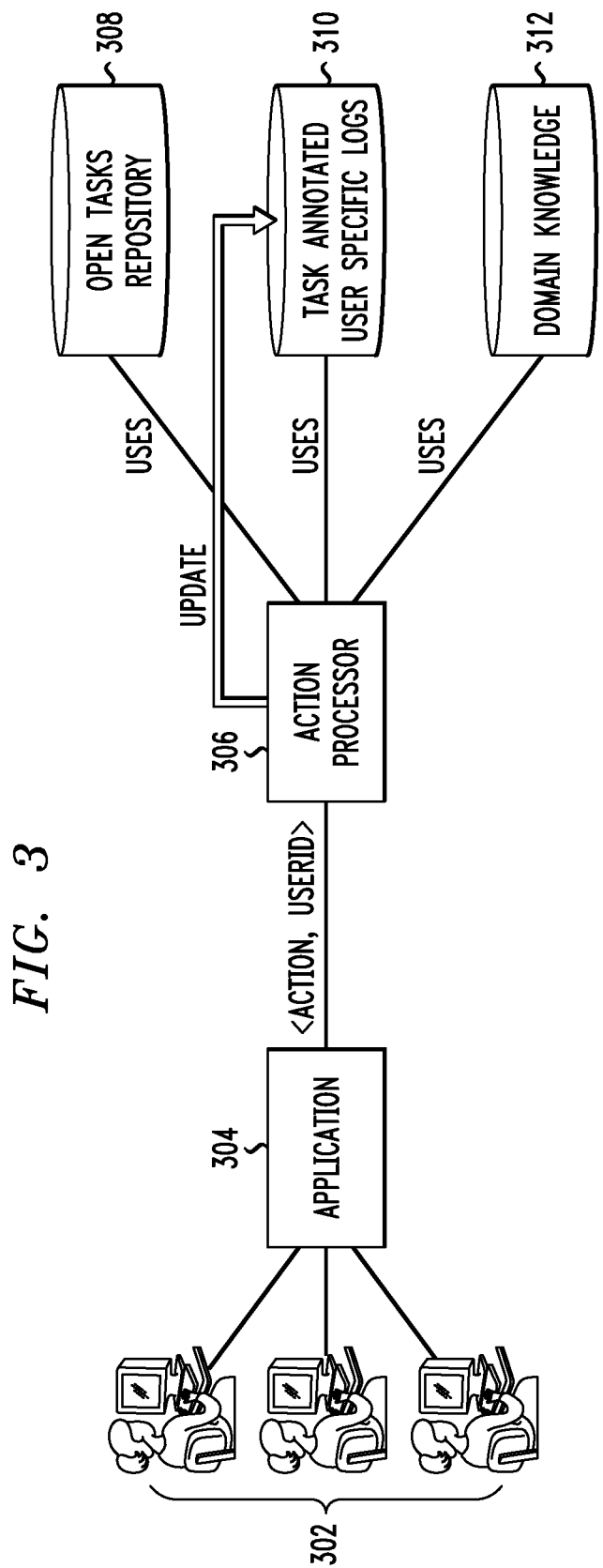
FIG. 3 is a diagram illustrating a log segregation approach, according to an embodiment of the present invention.

A block diagram of where the action processor would fit in, into a real system, can be, for example, as depicted in FIG. 3. FIG. 3 is a diagram illustrating a log segregation approach, according to an embodiment of the present invention. By way of illustration, FIG. 3 depicts the elements of user(s) 302, an application 304, action processor 306, open task repository 308, task annotated user specific logs 310, and domain knowledge 312. As depicted in FIG. 3, one or more users 302 can be using an application 304 at any given time.

In one or more embodiments of the present invention, an application feeds recent actions to the action processor. The action processor can use domain knowledge and log histories to populate the probability distribution and other information (links, effects, etc.), as well as update the logs with the specific action.

For every action a to be logged, one can get the set of tasks associated with the agent agent(a) as t={t1, t2, t3, . . . tn} from the open tasks repository. Also, one can get a probability distribution P1 as the normalized distribution of textual similarities over t. The similarity can be computed with respect to the parameters of the action (for example, from domain knowledge). A probability distribution P2 can be obtained as the normalized weighted (decaying) average of distributions over the last w actions restricted to the set of tasks in t (for example, a smoothness constraint). Additionally, one can get a probability distribution P3 of an action b in history from which a link originates (if any), of which the current action is the target (for example, a task based constraint).

A distribution of recency of tasks opened in t as P4 (for example, a context based constraint) can be obtained, as well as a distribution of tasks closed after this action as P5 (for example, a context based constraint). Further, one can pool in the above distributions using linear or logarithmic opinion pooling to find a final distribution P for a. Also, one can add <a, P> to the log specific to agent (a).

Figure 4:
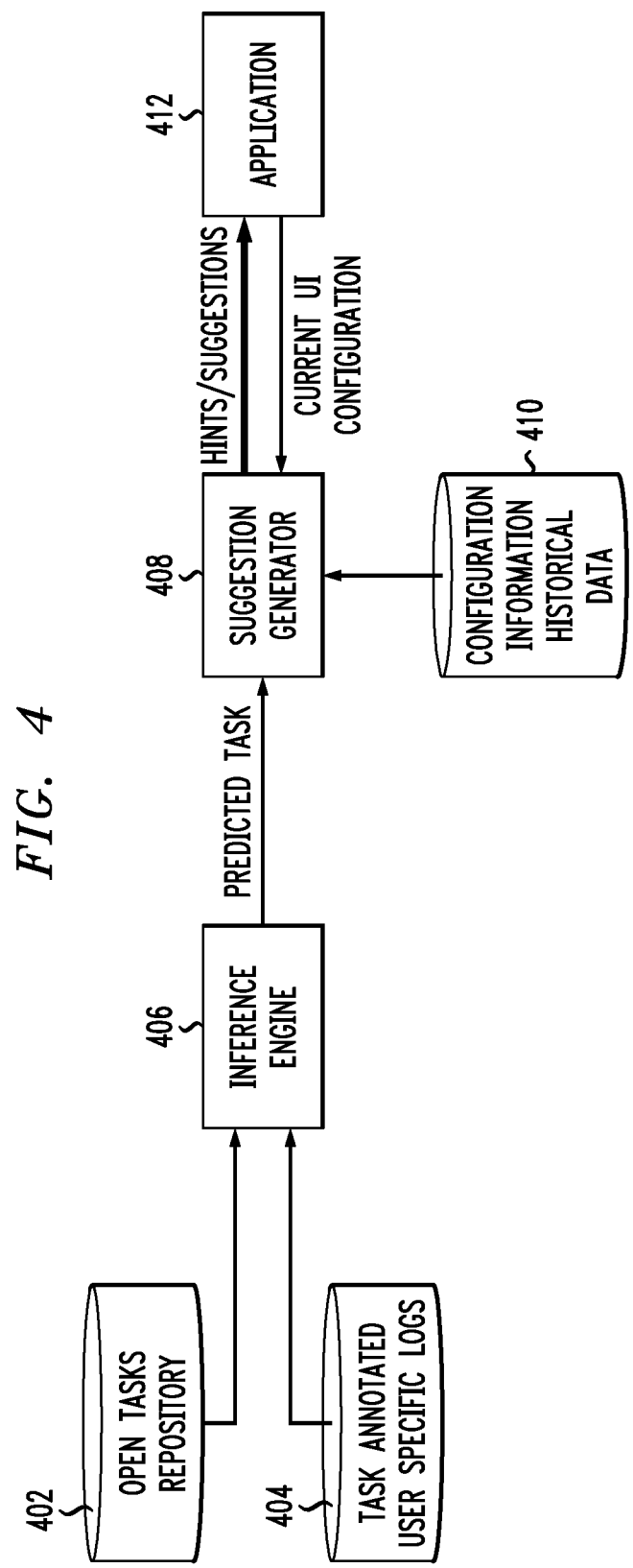
FIG. 4 is a diagram illustrating auto-suggestion in the user interface (UI), according to an embodiment of the present invention.

FIG. 4 is a diagram illustrating auto-suggestion in the user interface (UI), according to an embodiment of the present invention. By way of illustration, FIG. 4 depicts the elements of open tasks repository 402, task annotated user specific logs 404, interface engine 406, suggestion generator 408, configuration information historical data 410 and application 412.

As depicted in FIG. 4, an inference engine 406 predicts the task associated with the future action. One can get the set of tasks associated with the agent a as t={t1, t2, t3, . . . tn} from the open tasks repository 402. One can also get a probability distribution P1 as the normalized weighted (decaying) average of distributions over the last w actions restricted to the set of tasks in t performed by a. A distribution of recency of tasks opened in t as P2 can additionally be obtained. The above distributions can be pooled using linear or logarithmic opinion pool to find a final distribution P for a. If the confidence in the task with the highest confidence is greater than $\beta$, one can output that task to the suggestion generator.

As also depicted in FIG. 4, a suggestion generator 408 can use the current UI configuration and the task f to generate some suggestions for the user. One can get the set of actions p that can be performed on the current configuration of the UI. For each action in p, a set of parameters can be determined for the action which is relevant if the user is working on the task f. One can pass these as suggestions to the application 412 which would get displayed. Alternatively, those actions can be initiated and the results may be presented to the user. For example, if the user is working on an "OS Scheduling" assignment and is on the search page, the suggestion could be "search for OS Scheduling." If the user is working on an "OS Scheduling" assignment and is on the course home page, the suggestion could be "go to Assignments section." If the user is working on a problem ticket T which relates to server S, on the ticket details page, one can suggest action "Show configuration of server S".

Figure 5:
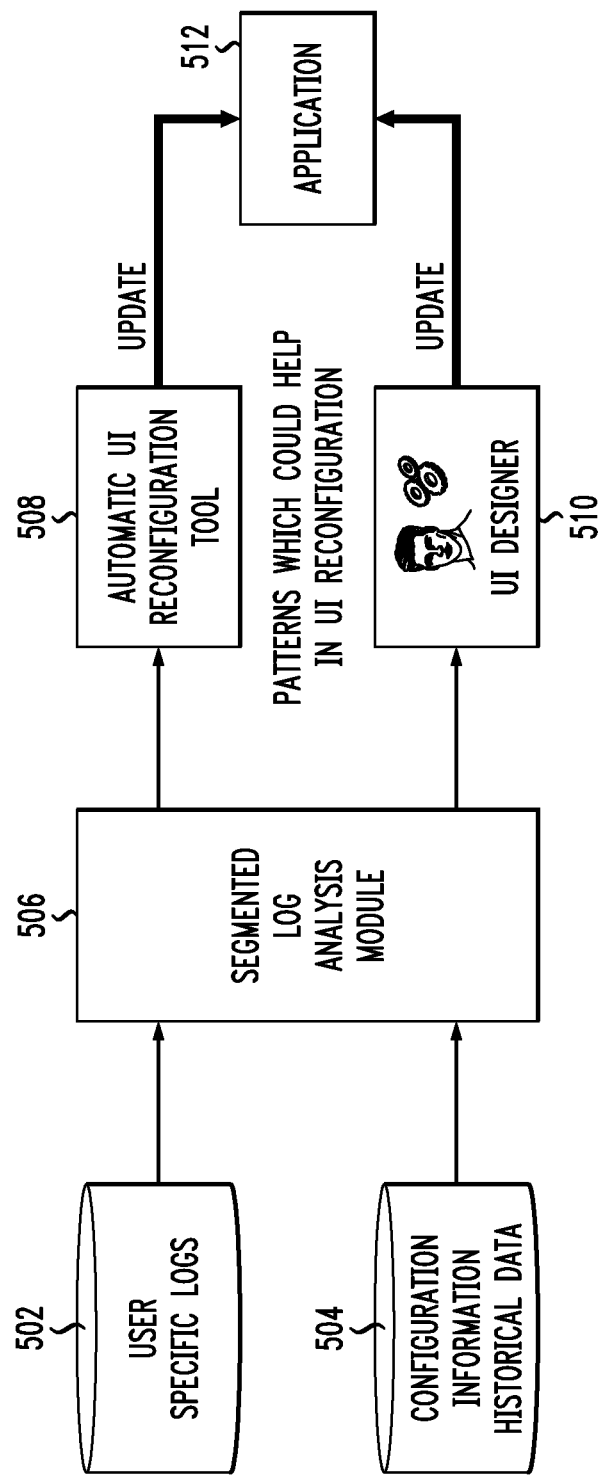
FIG. 5 is a diagram illustrating UI redesign, according to an embodiment of the present invention.

FIG. 5 is a diagram illustrating UI redesign, according to an embodiment of the present invention. By way of illustration, FIG. 5 depicts the elements of user specific logs 502, configuration information historical data 504, segmented log analysis module 506, automatic UI reconfiguration tool 508, UI designer 510 and application 512.

As illustrated in FIG. 5, one or more embodiments of the invention include a segmented log analysis module 506 that can be used to mine the segmented logs for suggestions on UI reconfiguration. The suggestions could be arrived at, for example, via mining of frequent long effective action sequences, mining of frequent contiguous action patterns, and/or finding default and/or common values for parameters for various actions. Also, one or more embodiments of the present invention include an automatic UI reconfiguration tool 508 that can use the patterns arrived at by the segmented log analysis module 506 to reconfigure the UI.

As described herein, one or more embodiments of the invention include UI redesign using frequent long and effective action sequences. Discovery of frequent long and effective (FLE) action sequences can be used to mine the logs for frequent long and effective sequences. One can use frequent sequence mining algorithms to find a set of long and frequent sequences. As an example, one can count only sub sequences such that the number of other actions occurring within that sequence is within a threshold. For example, if the threshold is 2, one will count the sequence AB in ACCB, but not in ACCCB as A and B have more than 2 tokens in between them in ACCCB. If the edit distance between two sequences is small, one can consider them as same and add their counts. For example, a sequence ABCDE can be considered equivalent to ABCCE if the tolerance of edit distance is set to 1. This will enable handling of noise in the log.

One can assign an effectiveness score to each such sequence using factors such as, for example, and average completion time of a task using that sequence, average quality of tasks when such a sequence is used. Quality can be marks scored for an assignment task. Additionally, one can output the subset of sequences that have an effectiveness score>η, where η is a threshold that is taken as a parameter.

In one or more embodiments of the invention, the UI can be reconfigured to drive the user towards using more of the FLE sequences. At any given UI configuration (such as a tab), one can find the action that is performed most frequently in FLE sequences on reaching that configuration and highlight that action so that the user may be driven towards performing that action. For example, the most common action on reaching a "professor's home page" may be to go to the courses page.

Further, one or more embodiments of the present invention include placing automation buttons at places in the UI so that common frequent sequences of actions may be performed at one shot. One can find very common contiguous subsequences from FLE sequences using a variant of the AprioriAll algorithm. The system designer can look at these sequences and identifies candidates for automation. Automation of such sequences can be done, for example, by placing batch execution buttons. For example, batch execution buttons can include "Click here to find all courses related to 'OS' in US universities," and "Click here to reboot the server, start the email application and close the ticket." One can also change the layout so that some actions are not required. For example, in a tabbed UI, changing tabs can be eliminated by placing portlets that are accessed together in the same tab.

As described herein, one or more embodiments of the invention include UI redesign using frequently contiguous action patterns. One can discover sequences of actions that always tend to occur together by using a variant of frequent sequence mining to arrive at sequences of actions that always occur together.

Further, one or more embodiments of the present invention include UI reconfiguration using contiguous action patterns. One can, for example, redesign the UI to allow for easy and minimum effort execution of frequently contiguous action patterns. For example, one can try to get to a situation where most contiguous sequences can be completed on the same tab of the UI. This can be done by maximizing the "Easiness Score," as described below.

$$\text{Easiness Score} = \Sigma i (\text{Frequency of } i) * (\text{Percentage of actions in the same tab in } i),$$

where i is an action sequence. One can also use a greedy algorithm to change the placement of portlets and/or buttons on the UI to maximize the easiness score.

Applications of log separation can include, for example, the following. Log separation can he used to aid a user via assistance by real-time task suggestions, automation of sequences of actions, etc. Also, log separation can be used to help the administrator (admin) aid the user via assistance to the admin for interface variation to enable better and more efficient usage. Additionally, log separation can be used to aid the admin to understand the various procedures that users use to solve various issues, and to monitor the deviations in user behavior to detect suspicious user activity and/or to document undocumented and efficient procedures.

Figure 6:
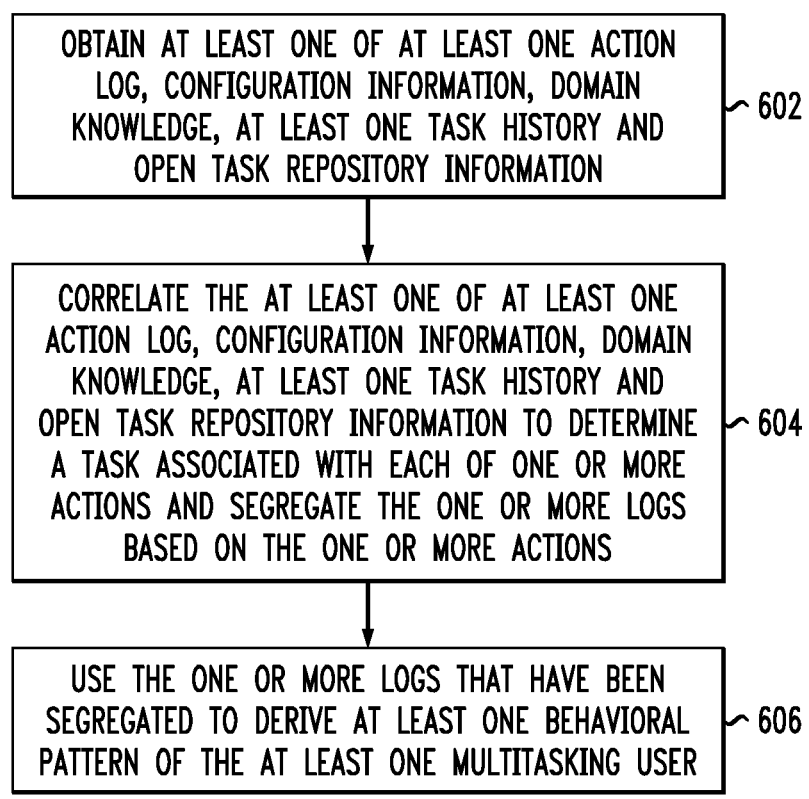
FIG. 6 is a flow diagram illustrating techniques for segregating one or more logs of at least one multitasking user to derive at least one behavioral pattern of the at least one multitasking user, according to an embodiment of the present invention.

FIG. 6 is a flow diagram illustrating techniques for segregating one or more logs of at least one multitasking user (for example, where there is no explicit indication of a task associated with each action performed) to derive at least one behavioral pattern of the at least one multitasking user, according to an embodiment of the present invention. Step 602 includes obtaining at least one of at least one action log, configuration information, domain knowledge, task histories and open task repository information. In one or more embodiments of the invention, the accuracy of the log segregation improves as more information becomes available. Step 604 includes correlating the action logs, configuration information, domain knowledge, task histories and open task repository information to determine a task associated with each of one or more actions and segregating the logs based on the actions.

Step 606 includes using the logs that have been segregated to derive at least one behavioral pattern of the multitasking users. Segregating the logs can include, for example, using constraints such as smoothness constraints, contextual constraints, domain knowledge based constraints and task-based constraints.

One or more embodiments of the invention include segregating the logs of multitasking users on a per task basis. Each log can include, for example, usage information, and wherein the usage information comprises at least one of user name, session, time, action performed, one or more parameters to an action, one or more items passed to an action, duration of an action and one or more preceding linked actions.

Also, the techniques depicted in FIG. 6 can include using the logs that have been segregated to monitor user activity (for example, to detect suspicious deviations from regular behavior).

Figure 7:
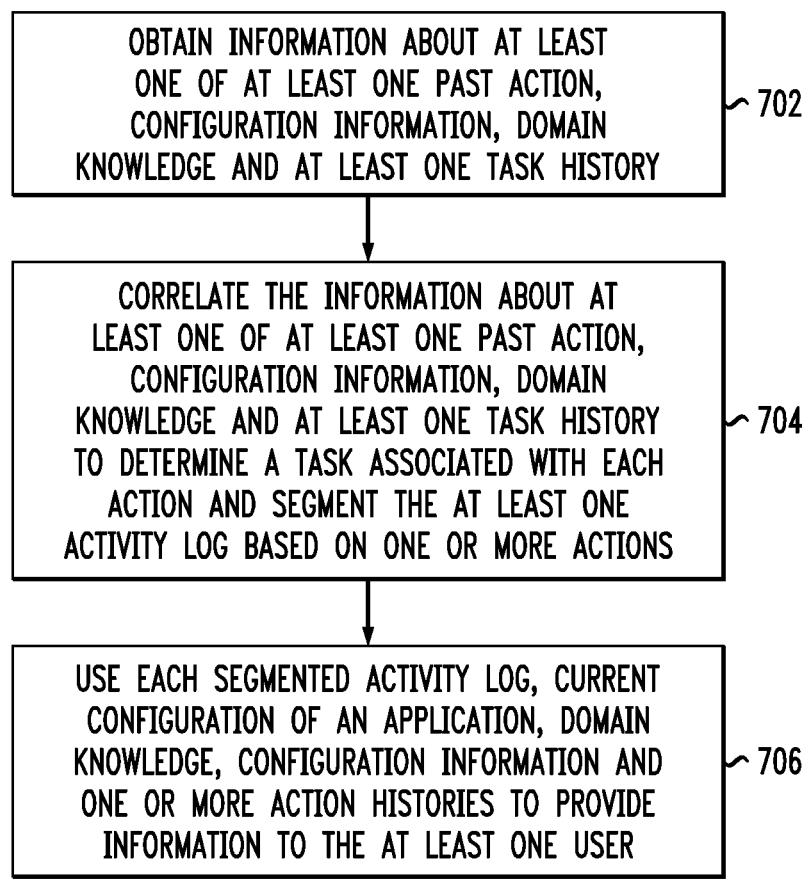
FIG. 7 is a flow diagram illustrating techniques for deriving intelligence from at least one activity log of at least one multitasking user to provide information to the at least one user, according to an embodiment of the present invention.

FIG. 7 is a flow diagram illustrating techniques for deriving intelligence from at least one activity log of at least one multitasking user to provide information to the at least one user, according to an embodiment of the present invention. Step 702 includes obtaining information about at least one of past actions, configuration information, domain knowledge and task histories. In one or more embodiments of the invention, the accuracy of the log segmentation improves as more information becomes available. Step 704 includes correlating the information about at least one of past actions, configuration information, domain knowledge and task histories to determine a task associated with each action and segment the activity logs based on actions. Step 706 includes using each segmented activity log, current configuration of an application, domain knowledge, configuration information and action histories to provide information to the at least one user.

The techniques depicted in FIG. 7 can also include reconfiguring a user interface (UI) using information gained by mining one or more task-based segmented user logs, and/or using at least one contiguous action pattern. Additionally, a UI can be reconfigured to drive a user towards using one or more frequent long and effective sequences. Further, one or more embodiments of the invention include placing automation buttons at a place in a UI to facilitate execution of a common frequent sequence of action.

Additionally, the techniques depicted in FIG. 7 can include generating suggestions for the user based on a current user interface (UI) configuration and a predicted task, and displaying the suggestions in the UI. One or more embodiments of the invention can also include generating suggestions for the user based on a current user interface (UI) configuration and a predicted task, executing the suggestions, and displaying the results in the UI.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 8:
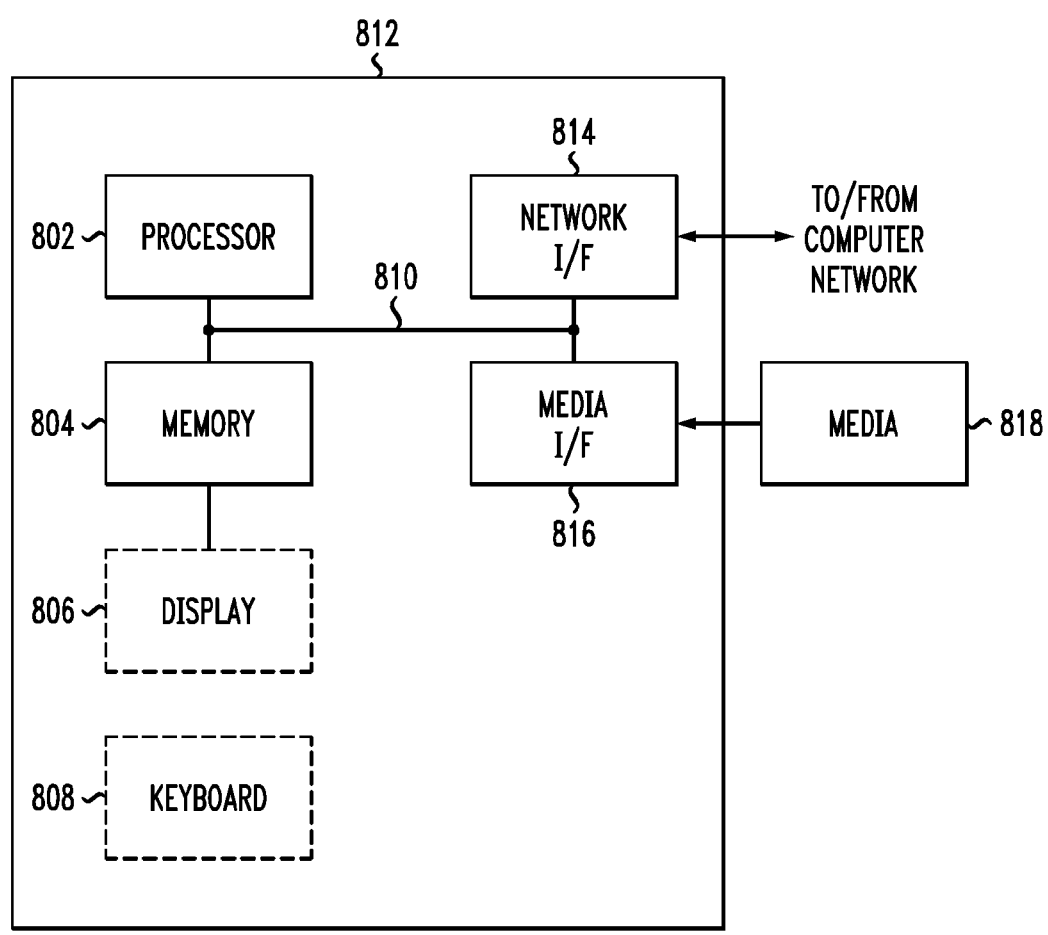
FIG. 8 is a system diagram of an exemplary computer system on which at least one embodiment of the present invention can be implemented.

At present, it is believed that the preferred implementation will make substantial use of software running on a general-purpose computer or workstation. With reference to FIG. 8, such an implementation might employ, for example, a processor 802, a memory 804, and an input and/or output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 802, memory 804, and input and/or output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 804), magnetic tape, a removable computer diskette (for example, media 818), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, automatically segregating logs on a per-task basis.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer program product comprising a computer readable medium having computer readable program code for segregating multiple action logs of at least one multi-tasking user to derive at least one behavioral pattern of the at least one multitasking user, said computer program product including:

computer readable program code for obtaining multiple action logs for a user from multiple web sites, configuration information, domain knowledge, at least one task history and open task repository information;

computer readable program code for correlating the multiple action logs, configuration information, domain knowledge, at least one task history and open task repository information to determine a task associated with each of one or more actions in the multiple action logs, where there is no explicit indication of the task associated with each of the one or more actions performed, wherein said correlating comprises:

associating each of one or more actions in the multiple action logs with a task in the open task repository;

computing a confidence score for each task in the open task repository associated with the one or more actions, said computing comprising:

computing a first probability distribution for a set of tasks associated with the user from the open task repository as a normalized weighted average of distributions over a pre-determined number of previous actions restricted to the set of tasks performed by the user;

computing a distribution of recency of tasks opened in the set of tasks; and combining the probability distribution and the distribution of recency of tasks to determine a second probability distribution for the user; and identifying the task with the highest confidence score, wherein the highest confidence score corresponds to the task having the maximal probability in the second probability distribution;

computer readable program code for automatically segregating the multiple action logs of the at least one multitasking user on a per-task basis based on the identified task; and computer readable program code for using the multiple action logs that have been segregated on a per-task basis to derive at least one behavioral pattern of the at least one multitasking user and a sequence of one or more additional actions based on the identified task and the at least one behavioral pattern.

2. The computer program product of claim 1, wherein the computer readable program code for segregating one or more logs of at least one multitasking user comprises computer readable program code for segregating at least two logs of at least one multitasking user on a per task basis.

3. The computer program product of claim 1, wherein each log comprises usage information, and wherein the usage information comprises at least one of user name, session, time, action performed, one or more parameters to an action, one or more items passed to an action, duration of an action and one or more preceding linked actions.

4. The computer program product of claim 1, wherein the computer readable program code for segregating the one or more logs comprises computer readable program code for using at least one constraint, and wherein the at least one constraint comprises at least one of a smoothness constraint, a contextual constraint, a domain knowledge based constraint and a task-based constraint.

5. The computer program product of claim 1, further comprising computer readable program code for using the one or more logs that have been segregated to monitor user activity.

6. A computer program product comprising a computer readable medium having computer readable program code for deriving intelligence from multiple activity logs of at least one multitasking user to provide information to the at least one user, said computer program product including:

computer readable program code for obtaining information about at least one past action from multiple action logs for a user, configuration information, domain knowledge, at least one task history and open task repository information;

computer readable program code for correlating the information about the at least one past action, configuration information, domain knowledge, at least one task history and open task repository information to determine a task associated with each action where there is no explicit indication of the task associated with each action performed, wherein said correlating comprises:

associating each action from the multiple action logs with a task in the open task repository;

computing a confidence score for each task in the open task repository associated with each action, said computing comprising:

computing a first probability distribution for a set of tasks associated with the user from the open task repository as a normalized weighted average of distributions over a pre-determined number of previous actions restricted to the set of tasks performed by the user;

computing a distribution of recency of tasks opened in the set of tasks; and combining the probability distribution and the distribution of recency of tasks to determine a second probability distribution for the user; and identifying the task with the highest confidence score, wherein the highest confidence score corresponds to the task having the maximal probability in the second probability distribution;

computer readable program code for automatically segmenting the multiple activity logs of the at least one multitasking user on a per-task basis based on the identified task; and computer readable program code for using each segmented activity log, current configuration of an application, domain knowledge, configuration information and one or more action histories to provide a sequence of one or more additional actions based on the identified task to the user.

7. The computer program product of claim 6, further comprising computer readable program code for:

generating at least one suggestion for the at least one user based on a current user interface (UI) configuration and a predicted task; and displaying the at least one suggestion in the UI.

8. The computer program product of claim 6, further comprising computer readable program code for:

generating at least one suggestion for the at least one user based on a current user interface (UI) configuration and a predicted task;

executing the at least one suggestion; and displaying a result in the UI.

9. The computer program product of claim 6, further comprising computer readable program code for reconfiguring a user interface (UI) using information gained by mining one or more task-based segmented user logs.

10. The computer program product of claim 6, further comprising computer readable program code for reconfiguring a user interface (UI) to drive a user towards using one or more frequent long and effective sequences.

11. The computer program product of claim 6, further comprising computer readable program code for placing at least one automation button at a place in a user interface (UI) to facilitate execution of a common frequent sequence of action.

12. The computer program product of claim 6, further comprising computer readable program code for reconfiguring a user interface (UI) using at least one contiguous action pattern.

13. A system for segregating multiple action logs of at least one multitasking user to derive at least one behavioral pattern of the at least one multitasking user, comprising:

a memory; and at least one processor coupled to said memory and operative to:

obtain multiple action logs for a user from multiple web sites, configuration information, domain knowledge, at least one task history and open task repository information;

correlate the multiple action logs, configuration information, domain knowledge, at least one task history and open task repository information to determine a task associated with each of one or more actions in the multiple action logs, where there is no explicit indication of the task associated with each of the one or more actions performed, wherein said correlating comprises:

associating each of one or more actions in the multiple action logs with a task in the open task repository;

computing a confidence score for each task in the open task repository associated with the one or more actions, said computing comprising:

computing a first probability distribution for a set of tasks associated with the user from the open task repository as a normalized weighted average of distributions over a pre-determined number of previous actions restricted to the set of tasks performed by the user;

computing a distribution of recency of tasks opened in the set of tasks; and combining the probability distribution and the distribution of recency of tasks to determine a second probability distribution for the user; and identifying the task with the highest confidence score, wherein the highest confidence score corresponds to the task having the maximal probability in the second probability distribution;

automatically segregate the multiple action logs of the at least one multitasking user on a per-task basis based on the identified task; and use the multiple action logs that have been segregated on a per-task basis to derive at least one behavioral pattern of the at least one multitasking user and a sequence of one or more additional actions based on the identified task and the at least one behavioral pattern.

14. The system of claim 13, wherein each log comprises usage information, and wherein the usage information comprises at least one of user name, session, time, action performed, one or more parameters to an action, one or more items passed to an action, duration of an action and one or more preceding linked actions.

15. The system of claim 13, wherein in segregating the one or more logs, the at least one processor coupled to said memory is further operative to use at least one constraint, and wherein the at least one constraint comprises at least one of a smoothness constraint, a contextual constraint, a domain knowledge based constraint and a task-based constraint.

16. The system of claim 13, wherein the at least one processor coupled to said memory is further operative to use the one or more logs that have been segregated to monitor user activity.

\* \* \* \* \*